United States Patent Office 3,155,601
Patented Nov. 3, 1964

3,155,601
STABILIZING OF CYANHYDRINS IN ACRYLONITRILE SOLUTIONS
James D. Idol, Jr., Shaker Heights, Ohio, assignor to The Standard Oil Company, Cleveland, Ohio, a corporation of Ohio
No Drawing. Filed Dec. 29, 1961, Ser. No. 163,091
2 Claims. (Cl. 202—57)

This invention relates to the purification of unsaturated nitriles such as acrylonitrile and methacrylonitrile, to separate them from small amounts of hydrogen cyanide.

When an olefin, such as propylene or isobutylene is reacted with ammonia and oxygen to produce the corresponding unsaturated nitriles such as acrylonitrile or methacrylonitrile, there is also produced substantial amounts of hydrogen cyanide and trace amounts of carbonyl compounds of relatively low molecular weight, such as acetaldehyde, propionaldehyde, acrolein, methacrolein, acetone, methyl ethyl ketone, etc.

The separation of the hydrogen cyanide presents troublesome problems because it combines with the carbonyl compounds to form cyanhydrins. These cyanhydrins decompose to hydrogen cyanide and the corresponding carbonylic under some operating conditions, and recombine to form the cyanhydrin under other conditions so that it is difficult to eliminate the hydrogen cyanide. Because of its objectionable nature, hydrogen cyanide must be eliminated from the nitrile produced.

I have discovered that the cyanhydrins can be effectively stabilized and the above-mentioned decomposition can be suppressed by the addition of small amounts of oxalic acid to the unsaturated nitrile containing the cyanhydrins. The oxalic acid is superior to phosphoric acid, sulfuric acid, acetic acid and similar acids in that it does not form sludges which is the case with the mineral acids, and it is the proper strength to stabilize the cyanhydrins, which is not the case with most organic acids.

The best mode that I presently contemplate for carrying out my invention is as follows:

A stream of acrylonitrile containing trace amounts (0.01%) hydrogen cyanide as cyanhydrins which is to be purified, is fed into a fractionating column which is equipped with a reboiler at the bottom, a condenser for the vapors taken overhead, and means for returning most of the condensate to the column as reflux. Means are provided for purging a portion of the condensate periodically from which low boiling components may be stripped and the stripped acrylonitrile added to the reflux. Means are also provided to continuously or periodically withdraw a portion of the contents of the reboiler and the acrylonitrile can be stripped therefrom and returned to the fractionating column leaving the cyanhydrins and other heavy boiling components. A side stream near the top of the column, preferably about one-fourth of the way from the top, is provided, from which the cyanide-free acrylonitrile may be withdrawn. A feed stream is provided near the center or the bottom of the column from which the acrylonitrile to be purified is fed. The oxalic acid may be introduced into this feed stream or at any point in the column below the product take-off stream or in the reboiler, but it is most convenient to add it either continuously or periodically.

The oxalic acid can be added in any form but is most conveniently added as an aqueous solution, preferably concentrated or saturated, although solid oxalic acid may also be introduced. The oxalic acid may also be dissolved in a portion of the acrylonitrile to be purified and this stream added to the crude acrylonitrile stream to be purified.

The amount of oxalic acid added either continuously or periodically is in the ratio of 0.001 to 0.1 pound of oxalic acid per 100 pounds of acrylonitrile feed to the column. Under these circumstances, the hydrogen cyanide is effectively combined and stabilized as the cyanhydrin and the side stream withdrawn near the top of the column contains little, usually less than 10 parts per million, of titratable cyanide.

I claim:
1. A method of purifying an unsaturated nitrile selected from the group consisting of acrylonitrile and methacrylonitrile containing chemically bound hydrogen cyanide combined with a carbonyl compound in the form of a cyanhydrin said cyanhydrin having the —OH and —CN groups attached to the same carbon atom which normally tends to decompose during the distillation of the unsaturated nitrile and contaminate the distilled product with hydrogen cyanide, which method comprises adding to said unsaturated nitrile 0.001 to 0.1 pound of oxalic acid per 100 pounds of unsaturated nitrile, and distilling the nitrile in the presence of the oxalic acid and recovering said unsaturated nitrile as the overhead.

2. In a process of distilling acrylonitrile in a fractional distillation zone which comprises feeding to the zone near the bottom thereof a feed stream of acrylonitrile containing hydrogen cyanide combined with a carbonyl compound in the form of a cyanhydrin, reboiling a portion of the liquid from the bottom of the zone and returning the vapors thereto, condensing the overhead vapors and returning at least a portion of the condensate to the fractional distillation zone as reflux, and withdrawing a side stream of purified acrylonitrile product near the top of the zone, the improvement which consists in adding to the acrylonitrile fed to the zone to be purified from 0.001 to 0.1 pound of oxalic acid per 100 pounds of acrylonitrile feed.

References Cited in the file of this patent

UNITED STATES PATENTS

| | | |
|---|---|---|
| 2,416,624 | Hansley | Feb. 25, 1947 |
| 2,623,896 | Beier | Dec. 30, 1952 |
| 2,793,227 | Sadle | May 21, 1957 |
| 2,827,423 | Carpenter | Mar. 18, 1958 |
| 2,830,073 | Carpenter et al. | Apr. 8, 1958 |

FOREIGN PATENTS

| | | |
|---|---|---|
| 585,644 | Great Britain | Feb. 14, 1947 |